Patented Aug. 26, 1947

2,426,430

UNITED STATES PATENT OFFICE 2,426,430

MANUFACTURE OF SPONGE RUBBER

William Binns, Harrogate, England

No Drawing. Application May 7, 1945, Serial No. 592,517. In Great Britain January 8, 1944

5 Claims. (Cl. 260—723)

This invention relates to the manufacture of sponge rubber from compounded and foamed latex, suitable, for example, for the production of upholstery.

Various processes for the manufacture of sponge rubber are already well known wherein compounded latex is brought into a foamed condition, for example, by mechanical stirring, whereby a substantial volume of air is occluded in the mass. The form is ordinarily set by incorporating gelling agents. The aerated gel so produced contains all the initial water which requires subsequently to be removed, e. g. by centrifuging and drying.

The process of the present invention is characterised by the employment of latex masses so compounded and foamed that they may be coagulated and vulcanised by subjection to heat from a source at temperatures exceeding 100° C., there being incorporated in the mass a higher fatty acid of wax-like nature, such for example as stearic acid, partly saponified with ammonium hydroxide or other base, preferable volatile. At elevated temperatures this fatty acid brings about the aggregation and coalescence of the rubber particles to a three-dimensional network.

In the preferred method of carrying out the invention the fatty acid is introduced into the latex in a preparation having thixotropic properties capable of being transmitted to the latex. This preparation comprises lipin, e. g. lecithin, or like phosphatide acting as a dispersing and emulsifying agent, a cationic soap, preferably dodecyl-trimethyl-ammonium-bromide, or cetyl-pyridinium-bromide or a mixture of both in equal or any desired proportion depending upon the condition of the latex, and a solution of methyl cellulose or other polydispersive substance whose colloid molecule is thread-like (see "The Ultracentrifuge" by Svedberg and Pedersen, Oxford University Press 1940, pages 325 to 353). When fillers are employed in the compounded latex there is also included in the fatty acid preparation a thin lubricating oil or other softening agent such as liquid paraffin or petroleum jelly. Water, preferably distilled, is added to bring the preparation to the necessary consistency. Ammonium hydroxide or other base, preferably of a volatile character, capable of producing a soluble soap is incorporated in this preparation so as to bring it to a pH comparable with that of the latex to which the preparation is to be added. The added ammonium hydroxide, or other base, will combine with part of the fatty acid to form a soap which will act as a stabiliser in the latex at room temperature during the compounding and foaming of the latex, but which, when the temperature is raised in the subsequent process, will dissociate, thus liberating the stearic acid to exert an aggregating effect on the rubber particles.

The fatty acid preparation containing the ingredients above mentioned, is passed through a colloid mill in order to effect thorough emulsification, and afterwards is preferably allowed to stand for a while, say 24 hours, when it will have solidified in the manner of a thixotropic system. When added to the latex this preparation imparts thixotropic properties thereto and this is an advantage in that the latex after having been foamed can be poured into moulds but after pouring will acquire sufficient rigidity to maintain its form during the initial stages of heating and until the rubber particles have coalesced into a continuous phase.

The preferred amount of fatty acid incorporated in the latex is between 3% and 4% by weight calculated on the dry rubber content of the latex. Therefore when the stearic acid is prepared in the manner set forth above the amount of preparation added to the latex will be such as to produce this relative proportion between amount of stearic acid and the rubber in the latex.

The fatty acid preparation is preferably mixed with the latex in a beating machine after the addition to the latex of the required vulcanised accelerators. The mixing is continued until the mixture acquires the viscosity of a cream, and thereupon it is introduced into a whisking machine comprising high speed stirrers, in which whilst whisking continues other required vulcanising ingredients are introduced. Then whilst whisking still continues there are gradually introduced such fillers as may be desired.

When the addition of fillers has been completed whisking is continued until the foam has reached the desired volume. The foam is then ready to be brought into the desired form, e. g. moulded, or sheeted, or spread on a backing, and to be heat-treated.

The foam will maintain its volume for a sufficient period to enable it to be transported to and poured into the moulds, or otherwise prepared for heat-treatment, care being taken to maintain an even temperature.

When the foamed mass is to be moulded the moulds employed are preferably made from aluminium and provided with perforated lids to permit the escape of hot air, steam and ammonia.

It is generally advantageous that the moulds should be warmed prior to being filled.

In order to prevent sticking to the moulds the latter may be lightly sprayed with a liquid preparation containing metallic stearate and whiting in suspension. A suitable preparation may be produced as follows:

|  | Pounds |
|---|---|
| Zinc stearate | 4 |
| Ethylene glycol | 1 |
| Industrial methylated spirits | 3 | are mixed. This mixture is then put through a colloid mill together with a preparation made up of 60 lbs. water
250 ccs. of 28% aqueous ammonia solution
20 lbs. of whiting powder
10 gms. of Dixie Black (a proprietary brand of gas black) previously dispersed in 4 ozs. industrial methylated spirits.

After treatment in the colloid mill the mixture is diluted with 40 lbs. water.

Sufficient of the latex foam is poured into the pan of the mould substantially to fill the latter when the mould has been closed.

The heat treatment of the foam is preferably effected under conditions such that a progressive increase of temperature is applied. Thus, for example, moulds filled with the foam may be continuously conveyed through an oven divided into compartments at different temperatures e. g. an entrance temperature of 80° C. rising in stages to an exit temperature of 120° C. A normal duration for the heat treatment is from 1 hour to 1½ hours. At the end of this heat treatment the moulded rubber sponge is found to be vulcanised and can be readily removed from the moulds with a peeling action after their lids have been removed.

Drying of the moulded rubber is then completed, for example, by passing it through an oven at a temperature of, say, 80° C.

During the heat treatment the rubber particles of the foam segregate from the water and coalesce into threads which build into a network structure. This process proceeds inwardly from the surface in contact with the mould or hot air until the whole of the foam has been converted to a reticular sponge structure. The steam formed from the separated water serves to transfer the heat more rapidly than would be achieved by conduction alone, thereby expediting sponge formation in the centre of the foamed mass and subsequent vulcanisation of the rubber fibrils.

Amongst the advantages obtained by the process of this invention are the following:

1. High air to rubber ratios are readily obtainable.
2. Direct production of a reticular sponge structure as distinct from one comprising rubber cells whose walls, if not already perforated, must be subsequently punctured to achieve an open sponge structure.
3. A substantial proportion of the water is removed during the heat treatment and vulcanisation process.
4. The effect of the heat treatment as indicated above enables masses of widely different shapes and dimensions to be vulcanised in the same periods of time and under the same conditions.
5. The necessity of subsequently washing impurities from the sponge mass is obviated.

There will now be given by way of example detailed particulars concerning the compounding and foaming of a latex mix for the production of sponge rubber according to the invention. This will include, firstly, a description of the various materials employed and their manner of preparation before compounding.

LATEX

In this example the latex is of approximately 60% concentration and either centrifuged or creamed. The ammonia content may vary between 0.5 and 0.75%. Various brands of latex may be used and mixtures may be used if desired.

ACCELERATORS

The accelerators used in this example are the following:

Mercaptobenzthiazole
Zinc dibutyl dithiocarbamate
Zinc diethyl dithiocarbamate (ZDC)
Piperidine pentamethylene dithiocarbamate (2P)
Diethylammonium diethyl dithiocarbamate (DDCN)

The accelerators are employed in the proportion of 0.9 to 1% by weight calculated on the dry rubber content of the latex.

The first three of the above accelerators are made into a dispersion, referred to hereinafter as "accelerator dispersion," as follows:

28 lbs. thin lubricating oil and 150 ccs. of medicinal paraffin are heated to 60° C. on a water bath. Into this preparation is emulsified 2½ lbs. of a preparation produced by heating to 40° C. on a water bath, 7 lbs. 8 ozs. of a 4% solution of methyl cellulose, 11 lbs. 4 ozs. of distilled water, and 4 ozs. of a soap prepared from 10 lbs. of flaked stearic acid, previously melted on a water bath, to which are added 20 lbs. distilled water and 2 lbs. potassium hydroxide which have been heated to 70° C.; (these three ingredients are whisked in a trough to produce an aerated white foamy soap).

The 4% solution of methyl cellulose is prepared as follows:

To 192 lbs. of distilled water, previously heated to 80° C. is added 19 lbs. 4 ozs. methyl cellulose and the whole is stirred with a large paddle in a wooden vat. This is allowed to stand over night before adding cold 264 lbs. of distilled water. Stirring is effected until a homogeneous solution is obtained. Ammonia may be added to reduce viscosity if desired.

The emulsion of the lubricating oil, medicinal paraffin, methyl cellulose solution, distilled water and foamy soap prepared as described above then has introduced into it 1 lb. 14 ozs. of zinc dibutyl dithiocarbamate and 10 ozs. of ZDC. The resultant mixture is then taken off the water bath and poured into a suitable container, and there is added to it 11 lbs. 4 ozs. of mercaptobenzthiazole. When this is thoroughly mixed the remainder of the soapy methyl cellulose solution is added and the whole is whisked as follows:

15 minutes running—2 hours standing
5 minutes running—17 hours standing
5 minutes running The 2P accelerator is made into a solution as follows:

24 lbs. distilled water, 250 ccs. of 28% aqueous ammonia solution, 4 ozs. potassium soap mentioned above and 3 ozs. of a 4% methyl cellulose solution as mentioned above, are homogenized, and there is then added 12 lbs. of the 2P accelerator followed by whisking.

STEARIC ACID PREPARATION 20 lbs. of commercial stearic acid together with 12 lbs. of thin lubricating oil are heated for 40 minutes at 70° C. on a water bath.

6 ozs. of lipin are then added and heating is continued for a further 50 minutes at the same temperature. Then there are added 22 gms. of a cationic soap such as dodecyl - trimethyl- ammonium - bromide or cetyl - pyridinium- bromide, or a mixture thereof.

Heating is then continued for a further 30 minutes at the same temperature. To the preparation whilst still on the water bath is added cold 36 lbs. of a 3% solution of methyl cellulose prepared in a similar manner to the 4% solution of methyl cellulose already described, and the whole is then vigorously stirred. The preparation is then poured into a suitable container and there are added 44 lbs. of distilled water previously heated to 60° C. After further stirring there are then added 500 ccs. of 28% aqueous ammonia solution. The preparation is then put through a colloid mill to effect emulsification and the emulsion is allowed to stand for at least 24 hours in order that it shall have solidified in the manner of a thixotropic system.

VULCANISER

The vulcaniser preparation used in this example is a mixture of the following:

40 lbs. zinc oxide
27 lbs. sulphur
6 lbs. 12 ozs. Agerite White (an anti-oxidant manufactured by the Anchor Chemical Company)
2 lbs. 4 ozs. black colouring matter (such as carbon black, thermatomic black or activated charcoal)
1 lb. Ultramarine Blue
57 lbs. distilled water
5 lbs. stearic acid and wax preparation (produced in a similar manner to the stearic acid preparation above mentioned except that to the stearic acid and lubricating oil there is also added 2 lbs. yellow paraffin wax and that the lipin content is doubled)
4 ozs. of potassium soap prepared as above mentioned
250 ccs. of 25% solution KOH
250 ccs. of 28% aqueous ammonia solution The above mixture is then whisked and subsequently passed twice through a colloid mill whereby the resultant dispersion is given the consistency of a slurry.

LOADER DISPERSION

The composition employed in this example comprises 80 lbs. china clay (or whiting)
4 ozs. ferric oxide
73 lbs. distilled water
10 lbs. stearic acid preparation containing wax as described above
500 ccs. of 28% aqueous ammonia solution
500 ccs. of 25% KOH solution
4 ozs. potassium stearic acid soap produced as above described.

The above mixture is passed through a colloid mill whereby a consistency of thin cream is obtained.

DETAILS OF MIXES

There are given below four examples of suitable mixes for obtaining a sponge rubber of approximately 10, 12.5, 14 and 15 air-to-rubber volume ratios:

*10 volume mix*

36 lbs. latex
5½ ozs. acc. dispersion ⎫ 93 grms. dry accelerators to give 0.95% on
6 ozs. 2P solution           ⎬ dry rubber content
3 grms. DDCN powder ⎭
3 lbs. 10 oz. of stearic acid preparation equivalent to approx. 3% stearic acid
3 lbs. 6 ozs. vulcaniser equivalent to approx. 3% sulphur,
4 lbs. 7 ozs. loader dispersion equivalent to approx. 10% filler on dry rubber content.

*12.5 volume mix*

29 lbs. latex
6½ ozs. acc. dispersion ⎫ 79 grms. dry accelerator to give 1.0% on
3½ ozs. 2P solution          ⎬ dry rubber content
5 grms. DDCN powder ⎭
3 lbs. 4 ozs. stearic acid preparation equivalent to approx. 3.25% stearic acid
2 lbs. 11 ozs. vulcanizer equivalent to approx. 3% sulphur
3 lbs. 10 ozs. loader dispersion equivalent to approx. 10% filler, on dry rubber content.

*14 volume mix*

27 lbs. latex
5¾ ozs. acc. dispersion ⎫ 73½ grms. dry accelerator to give 1.0 % on
3½ ozs. 2P solution          ⎬ dry rubber content
5 grms. DDCN                 ⎭
3 lbs. 4 ozs. stearic acid preparation equivalent to approx. 3.5% stearic acid
2 lbs. 8 ozs. vulcanizer equivalent to approx. 3% sulphur
3 lbs. 6 ozs. loader dispersion equivalent to approx. 10% filler, on dry rubber content.

*15 volume mix*

23 lbs. latex
4 ozs. acc. dispersion    ⎫ 62.5 grms. dry accelerator to give 1.0% on
3½ ozs. 2P solution         ⎬ dry rubber content
5 grms. DDCN powder ⎭
3 lbs. 4 ozs. stearic acid preparation equivalent to approx. 4% stearic acid
2 lbs. 2 ozs. vulcanizer equivalent to approx. 3% sulphur
2 lbs. 14 ozs. loader dispersion equivalent to approx. 10% filler, on dry rubber content.

It will be understood that substantial changes can be made in regard to the ingredients specified in the above examples and in regard to proportions used. For instance, the loader dispersion may be increased up to 15% of filler if so desired. Further if a softer sponge rubber is desired with the 15 volume mix it is advantageous to use 10% lithopone added to the latex as dry powder in place of the loader disperson.

What I claim is:

1. Process for the manufacture of sponge rubber from compounded and foamed latex, characterized by introducing into the latex, prior to whisking to a foam, a preparation comprising a fine dispersion of solid particles of stearic acid in an aqueous soap thereof, the amount of stearic acid in the free state and combined in the soap being such that the mass contains between about 3% and 4% by weight of stearic acid calculated on the dry rubber content of the mass, and subsequently heating the foamed mass to a temperature at least as high as 80° C.

2. Process as claimed in claim 1, in which the said soap is a soap of stearic acid with ammonium hydroxide.

3. Process for the manufacture of sponge rubber from compounded and foamed latex, characterized by introducing into the latex, prior to whisking to a foam, a preparation comprising a fine dispersion of solid particles of stearic acid in an aqueous soap thereof, and a minor proportion of methyl cellulose, the amount of stearic acid in the free state and combined in the soap being such that the mass contains between about 3% and 4% by weight of stearic acid calculated on the dry rubber content of the mass, the quantity of free stearic acid being a small quantity sufficient to effect coagulation of the latex and subsequently heating the foamed mass to a temperature at least as high as 80° C.

4. Process for the manufacture of sponge rubber from compounded and foamed latex, characterized by introducing into the latex, after the addition of vulcanizing accelerators but prior to whisking to a foam, a preparation comprising a fine dispersion of solid particles of stearic acid in an aqueous soap thereof, the amount of stearic acid in the free state and combined in the soap being such that the mass contains between about 3% and 4% by weight of stearic acid calculated on the dry rubber content of the mass, the quantity of free stearic acid being a small quantity sufficient to effect coagulation of the latex, and subsequently heating the foamed mass to a temperature at least as high as 80° C.

5. Process for the manufacture of sponge rubber comprising the steps of mixing into latex an aqueous dispersion of vulcanization accelerators, introducing into the mixture a fine dispersion of solid particles of stearic acid in an aqueous soap thereof, the amount of stearic acid in the free state and combined in the soap being such that the mass contains between about 3% and 4% by weight of stearic acid calculated on the dry rubber content of the mass, the quantity of free stearic acid being a small quantity sufficient to effect coagulation of the latex, whisking the mass so prepared, introducing vulcanizing ingredients, in a dispersion containing a small proportion of paraffin wax, whilst whisking continues, and subsequently heating the whisked mass to a temperature above 80° C.

WILLIAM BINNS.

REFERENCES CITED

The following references are of record in the file of this patent:

UNITED STATES PATENTS

| Number | Name | Date |
| --- | --- | --- |
| 1,852,447 | Chapman | Apr. 5, 1932 |
| 2,261,439 | Kelly | Nov. 4, 1941 |
| 2,290,567 | Mackay | July 21, 1942 |
| 2,290,729 | Blair et al. | July 21, 1942 |
| 2,321,111 | Stamberger | June 8, 1943 |